United States Patent
Marcos Izquierdo et al.

(10) Patent No.: US 11,927,139 B2
(45) Date of Patent: Mar. 12, 2024

(54) SPLINED SHAFT

(71) Applicant: SAFRAN TRANSMISSION SYSTEMS, Colombes (FR)

(72) Inventors: Juan-Luis Marcos Izquierdo, Moissy-Cramayel (FR); Quentin Pierre Henri Pigott, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/884,730

(22) Filed: Aug. 10, 2022

(65) Prior Publication Data
US 2023/0051474 A1   Feb. 16, 2023

(30) Foreign Application Priority Data
Aug. 10, 2021 (FR) ...................... 2108617

(51) Int. Cl.
*F16D 1/10* (2006.01)
*F02C 7/36* (2006.01)
*F16H 57/08* (2006.01)

(52) U.S. Cl.
CPC ............. *F02C 7/36* (2013.01); *F16H 57/082* (2013.01); *F05D 2240/60* (2013.01); *F05D 2250/184* (2013.01); *F05D 2260/40311* (2013.01); *F16C 2226/80* (2013.01)

(58) Field of Classification Search
CPC ..... F05D 2260/40311; F16D 2001/103; F16C 2226/80
See application file for complete search history.

(56) References Cited

U.S. PATENT DOCUMENTS

| | | | | |
|---|---|---|---|---|
| 2,749,086 A | * | 6/1956 | Lombard | F01D 5/025 416/201 R |
| 2,928,649 A | * | 3/1960 | Lombard | F01D 5/06 416/198 A |
| 3,803,872 A | * | 4/1974 | Wolf | F16D 3/185 464/158 |
| 5,098,358 A | | 3/1992 | Igaku | |
| 10,683,773 B2 | * | 6/2020 | Savaria | F16H 57/0479 |
| 2020/0298619 A1 | * | 9/2020 | Oka | F16D 1/108 |

FOREIGN PATENT DOCUMENTS

| | | | |
|---|---|---|---|
| DE | 20 2013 004 236 U1 | 7/2013 | |
| JP | S60124338 U | * 8/1985 | |
| JP | H0673520 U | * 10/1994 | |
| JP | 2006307654 A | * 11/2006 | |
| JP | 2014-077474 A | 5/2014 | |
| JP | 2014077474 A | * 5/2014 | |
| WO | WO-9418466 A1 | * 8/1994 | ............ F16D 1/06 |

OTHER PUBLICATIONS

France Search Report and Written Opinion dated Mar. 25, 2022, issued in Application No. FR2108617, filed Aug. 10, 2021, 6 pages.

* cited by examiner

*Primary Examiner* — Sherry L Estremsky
(74) *Attorney, Agent, or Firm* — CHRISTENSEN O'CONNOR JOHNSON KINDNESS PLLC

(57) ABSTRACT

A splined shaft includes splines evenly distributed over the periphery, wherein the splines being spaced apart from each other. At least one portion of the splines are spaced apart by a modified pitch p with respect to the nominal pitch pn of the splines. The ratio of the absolute value of the difference between the modified pitch and the nominal pitch, to the nominal pitch, i.e. |pn−p|/pn, is different from zero, for example between 0.5 and 5%.

10 Claims, 5 Drawing Sheets

SPLINED SHAFT

CROSS-REFERENCE TO RELATED APPLICATION

This application claims priority to FR 2108617, filed Aug. 10, 2021, the disclosure of which is hereby expressly incorporated by reference herein in its entirety.

TECHNICAL FIELD

The present disclosure relates to a splined shaft and a planet carrier for a planetary gear train, including at least one support axis intended for mounting a planet gear and at least one splined shaft. In particular, such a planetary gear train is intended to form a speed reducer, in particular for a turbine engine.

BACKGROUND

The function of a speed reducer is to modify the speed and torque ratio between an input shaft and an output shaft of the reducer.

New generations of bypass turbine engine, in particular those having a high dilution ratio, include a speed reducer allowing driving the shaft of a fan. Commonly, the speed reducer is intended to transform the so-called fast rotational speed of a shaft of a power turbine of the turbine engine into a slower rotational speed allowing driving the shaft of the fan.

Such a speed reducer comprises a central pinion, called Sun gear, a ring gear and pinions called planet gears, which are trapped between the Sun gear and the ring gear. The planet gears are held by a member called planet carrier. The Sun gear, the ring gear and the planet carrier are called planetary elements, their axes of revolution coinciding with the longitudinal axis X of the turbine engine. The planet gears have distinct axes of revolution, evenly distributed over the same diameter around the axis of the planetary elements. The axes of the planet gears are parallel to the longitudinal axis X.

There are several layouts of speed reducers. In the state of the art of bypass turbine engine, the reducers are of the planetary or epicyclic type. In other similar applications, there are so-called differential reducers. In the case of a planetary reducer, the planet carrier is fixed, the Sun gear is connected to the input shaft and the ring gear is connected to the output shaft, the output shaft rotating in a direction opposite to the input shaft. In the case of an epicyclic reducer, the ring gear is fixed, the Sun gear is connected to the input shaft and the planet carrier is connected to the output shaft, the output shaft rotating in the same direction as the input shaft. Finally, in the case of a differential reducer, no element is fixed in rotation and the ring gear rotates in the direction opposite to the Sun gear and the planet carrier.

The reducers may be formed by one or more gearing stages. This gearing may be ensured in different manners, for example by contact, by friction or else by magnetic field. Moreover, there are several types of contact gearing, such as the use of straight or herringbone toothings.

For example, in the case of an epicyclic type layout, the planet carrier is for example connected to the output shaft via a splined shaft. In other words, the splined shaft includes a shaft including so-called male splines at its periphery, cooperating with complementary so-called female splines, of a driven shaft, or vice versa.

In operation, the torque transits radially along directions or lines each connecting one of the support axes of planet gears and the axis of the planet carrier.

It has been noticed that the absence of a homogeneous distribution of the loads over the circumference of the planet carrier generates a slight deformation of the splined shaft, so that some splines, so-called active, come into contact with the corresponding complementary splines while other splines, so-called passive, have less pronounced contacts, and possibly no contact, with the complementary splines. In practice, the active splines are located over and proximate to each of the aforementioned lines, the passive splines being away from said lines.

In such a case, the loads transit through the splines that are active, to the detriment of the passive splines, so that the distribution of the loads is not homogeneous over the entire circumference.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosure aims to overcome this drawback in a simple, reliable and inexpensive manner.

To this end, the disclosure relates to a splined shaft having a periphery and comprising splines evenly distributed over the periphery, the splines being spaced apart from each other, at least one portion of the splines being spaced apart by a modified pitch p with respect to the nominal pitch pn of the splines, the ratio of the absolute value of the difference between the modified pitch and the nominal pitch, to the nominal pitch, i.e. |pn−p|/pn being different from zero, preferably comprised between 0.5 and 5%.

The pitch p, expressed for example in mm, is defined as the modulus for the considered spline, namely as the value of the perimeter of the sector between two corresponding points of two consecutive splines divided by pi ($\pi$).

The nominal pitch may be defined as the average pitch of all splines of the shaft.

The shaft may be a hollow shaft. The aforementioned deformations seem to be more pronounced on a hollow shaft, in comparison with a solid shaft.

Modifying the pitch of at least some splines allows making some splines less active and making other splines more active, so as to better distribute the loads over all splines distributed over the circumference or the periphery of the splined shaft.

For at least one portion of the splines, the difference between the modified pitch and the nominal pitch may be positive, said splines being so-called in advance, and for at least one other portion of the splines, the difference between the modified pitch and the nominal pitch may be negative, said splines being so-called delayed.

The splines in advance could then be arranged at areas including splines that are passive in the case of the prior art, and the delayed splines could be arranged at areas including splines that are active in the case of the prior art. In this manner, it is possible to make all splines active, i.e. obtain a good distribution of mechanical stresses over all of the splines of the shaft.

The splined shaft may include, along the periphery, at least one alternation of splines in advance and of delayed splines.

In other words, the splined shaft may include at least one area including several splines in advance, followed by an area including several delayed splines. Of course, there is nothing that prevents that some splines could be neither in advance, nor delayed, but have a pitch corresponding to the nominal pitch.

The splined shaft may include, along the periphery, several successive alternations of splines in advance and of delayed splines.

The difference between the nominal pitch pn between the splines with respect to the modified pitch p, along the periphery, may progressively increase or decrease from one spline to another, as the periphery of the splined shaft is covered, said difference increasing up to a maximum before decreasing down to a minimum.

In other words, the difference pn–p could evolve over the circumference according to an alternately increasing or decreasing function.

The evolution of the pitch difference between the splines with respect to the nominal pitch, along the periphery, may follow a generally sinusoidal law.

It turns out that it is possible to easily achieve this sinusoidal evolution of the pitch difference when manufacturing the splined shaft, by means of current processes.

The evolution of the difference of the pitch between the splines with respect to the nominal pitch, along the periphery, may be a stepped evolution.

In other words, several successive splines may have the same pitch. Such an evolution could be easily obtained by machining at least one flank of each spline for example, when manufacturing the splines. Several distinct steps could exist, for example a minimum step, a maximum step and optionally at least one intermediate step.

The disclosure also includes a planet carrier for a planetary gear train, including at least one support axis intended for mounting a planet gear and at least one splined shaft according to one of the preceding claims.

Of course, the disclosure also applies to any structural part including a splined shaft, in particular a hollow splined shaft.

At least one delayed spline may be located on or proximate to the line connecting the splined shaft or the axis of the planet carrier, on the one hand, and the support axis of the planet, on the other hand, and/or at least one advanced spline may be away from said line.

Such a structure allows having the splines in advance at the areas including splines that are passive in the case of the prior art, and the delayed splines at the areas including splines that are active in the case of the prior art. Similarly, it is possible to make all splines active, i.e. obtain a good distribution of mechanical stresses over all of the splines of the shaft.

The disclosure also relates to a planetary gear train for a turbine engine, including at least one planet carrier of the aforementioned type.

The disclosure also relates to a turbine engine including a planetary gear of the aforementioned type. The turbine engine may be a turbojet engine or a turboprop engine. The turbine engine may be a bypass turbojet engine. The planetary gear train is able to form a speed reducer between a turbine shaft, for example a low-pressure turbine shaft, and a shaft intended to drive a fan.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Figure 1:
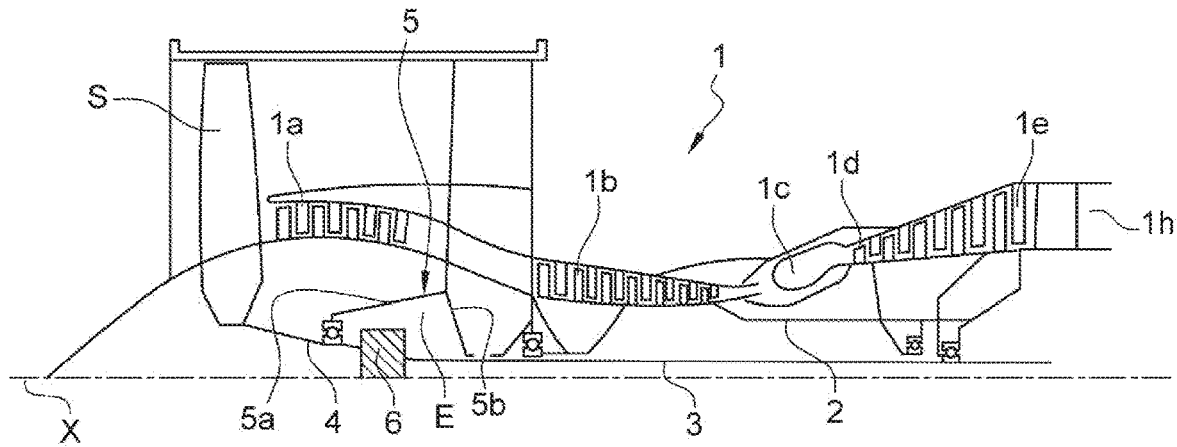
FIG. 1 is an axial sectional half-view of a turbine engine of the prior art.

FIG. 1 illustrates a turbine engine 1 which conventionally includes a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft and form with the latter a high-pressure (HP) spool. The low-pressure compressor 1a and the low-pressure turbine 1e are connected by a low-pressure shaft 3 and form with the latter a low-pressure (LP) spool.

The fan S is driven by a fan shaft 4 which is driven by the LP shaft 3 by means of a reducer 6. In general, this reducer is of the planetary or epicyclic type.

Although the following description relates to a planetary or epicyclic type reducer, it also applies to a mechanical differential wherein the three components, which are the planet carrier 10, the ring gear 9 and the Sun gear 7, are movable in rotation, the rotational speed of one of these components depending in particular on the speed difference of other the two components.

The reducer 6 is positioned in the upstream portion of the turbine engine. A fixed structure schematically including, herein, an upstream portion 5a and a downstream portion 5b which forms the engine casing or stator 5 is arranged so as to form an enclosure E surrounding the reducer 6. This enclosure E is herein closed upstream by seals at a bearing allowing the passage of the fan shaft 4, and downstream by seals at the passage of the LP shaft 3.

Figure 2:
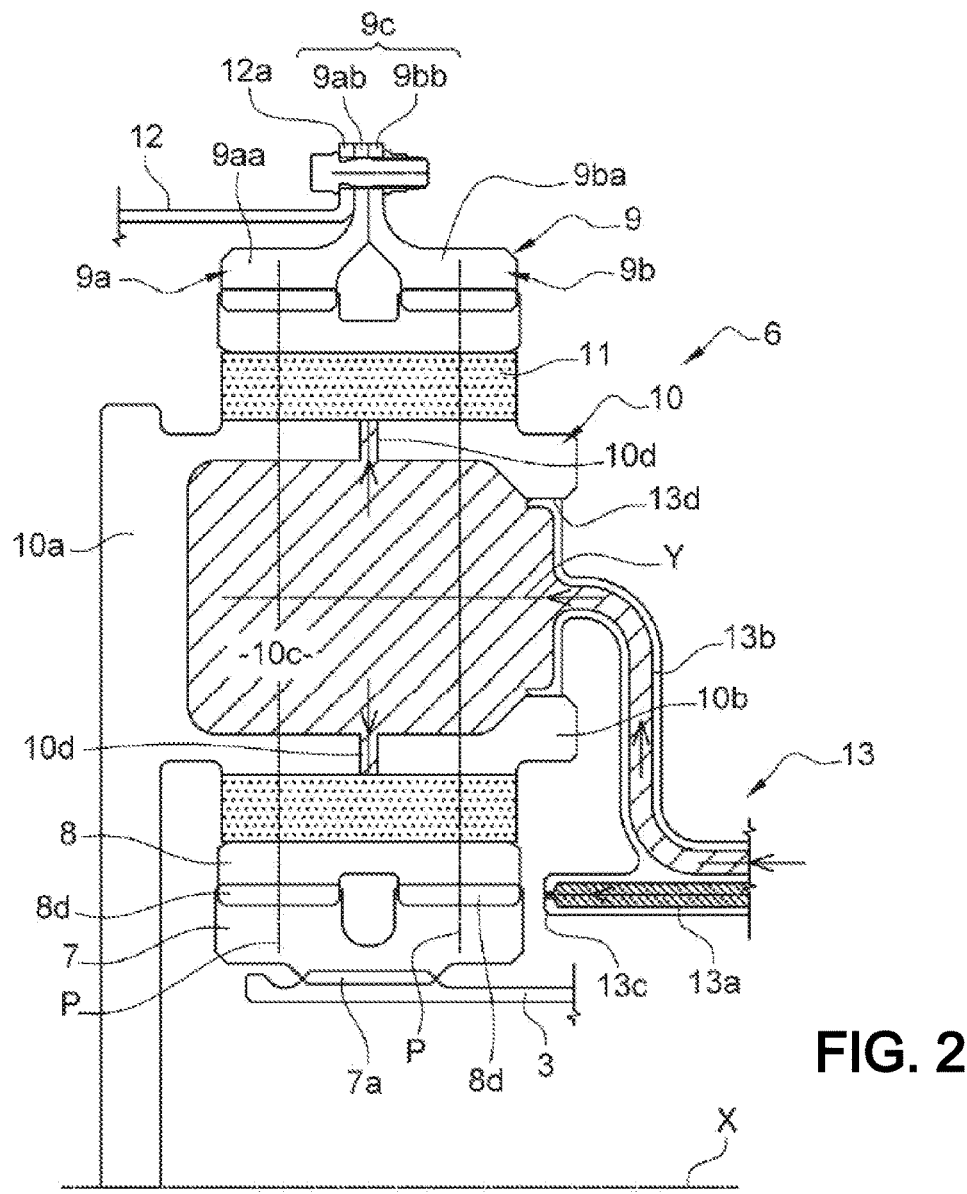
FIG. 2 is an axial sectional half-view of a portion of a speed reducer of the prior art.

FIG. 2 illustrates a reducer 6 which may be in the form of different layouts depending on whether some parts are fixed or rotating. At the input, the reducer 6 is connected to the LP shaft 3, for example via splines 7a. Thus, the LP shaft 3 drives a planetary pinion called the Sun gear 7. Conventionally, the Sun gear 7, whose axis of rotation is coincident with that of the turbine engine X, drives a series of pinions called planet gears 8, which are evenly distributed over the same diameter around the axis of rotation X. In general, the number of planet gears 8 is comprised between three and seven for this type of applications.

All planet gears 8 are held by a planet carrier 10. Each planet gear 8 rotates about its own axis Y, and meshes with the ring gear 9.

In an epicyclic configuration, all planet gears 8 drive in rotation the planet carrier 10 about the axis X of the turbine engine. The ring gear is fastened to the engine casing or stator 5 via a ring carrier 12 and the planet carrier 10 is fastened to the fan shaft 4.

In a planetary configuration, all planet gears 8 are held by a planet carrier 10 which is fastened to the engine casing or stator 5. Each planet gear drives the ring gear which is attached to the fan shaft 4 via a ring carrier 12.

Each planet gear 8 is mounted free in rotation by means of a bering 11, for example a rolling bearing or a hydrostatic bearing. Each bearing 11 is mounted on one of the axes 10b of the planet carrier 10 and all axes are positioned with respect to each other by means of one or more structural frames 10a of the planet carrier 10. There I a number of axes and bearings equal to the number of planet gears. For reasons relating to operation, mounting, manufacture, inspection, repair or replacement, the axes and the frame may be split into several parts.

For the same aforementioned reasons, the toothing of a reducer may be split into several helices. In our example, we detail the operation of a reducer with several helices with a ring gear split into 2 half ring gears:

a front half ring gear 9a formed by a rim 9aa and by a fastening half-flange 9ab. The front helix of the toothing of the reducer lies on the rim 9aa. This front helix meshes with that of the planet gear 8 which meshes with that of the Sun gear 7.

a rear half ring gear 9b formed by a rim 9ba and by a fastening half-flange 9bb. The rear helix of the toothing of the reducer lies on the rim 9ba. This rear helix meshes with that of the planet gear 8 which meshes with that of the Sun gear 7.

The fastening half-flange 9ab of the front ring gear 9a and the fastening half-flange 9bb of the rear ring gear 9b form the fastening flange 9c of the ring gear. The ring gear 9 is fastened to ring carrier by assembling the fastening flange 9c of the ring gear and the fastening flange 12a of the ring carrier by means of a bolted mounting for example.

The arrows of FIG. 2 describe the route of oil in the reducer 6. The oil arrives in the reducer 6 from the stator portion 5 in the distributor 13 by different means which will not be specified in this view because they are specific to one or more layout types. In general, the distributor is split into 2 portions, each repeated with the same number of planet gears. The injectors 13a are intended to lubricate the toothings and the arms 13b are intended to lubricate the bearings. The oil is conveyed towards the injector 13a before coming out by the end 13c in order to lubricate the toothings. The oil is also conveyed towards the arm 13b and circulates via the supply port 13d of the bearing. Afterwards, the oil circulates through the axis in one or more buffer areas 10c before coming out through the orifices 10d in order to lubricate the bearings of the planet gears.

Figure 3:
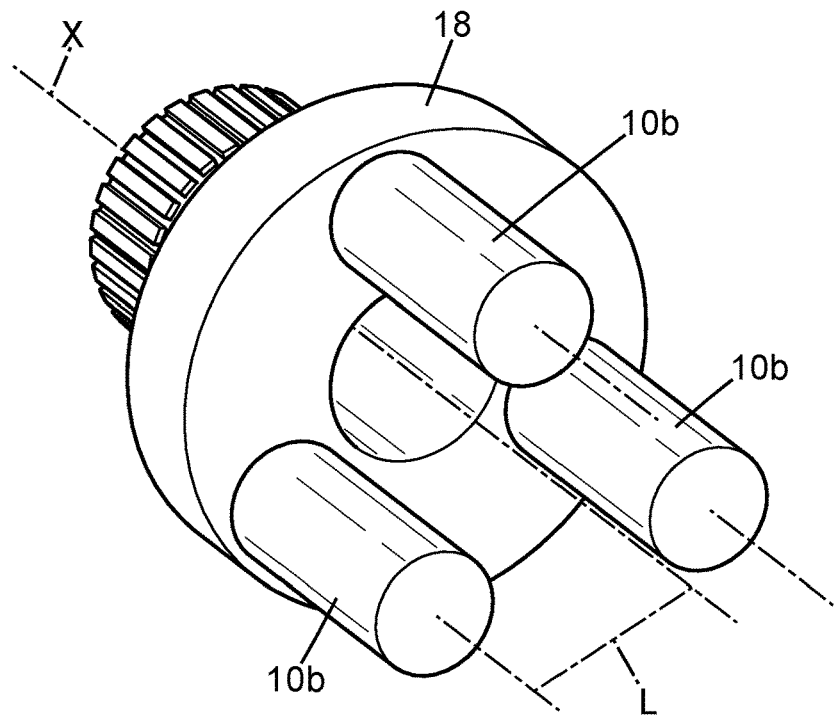
FIG. 3 is a perspective view of a planet carrier of an epicyclic gear train.

FIG. 3 illustrates a planet carrier 10 devoid of such lubrication means or for which said lubrication means are not represented.

Figure 4:
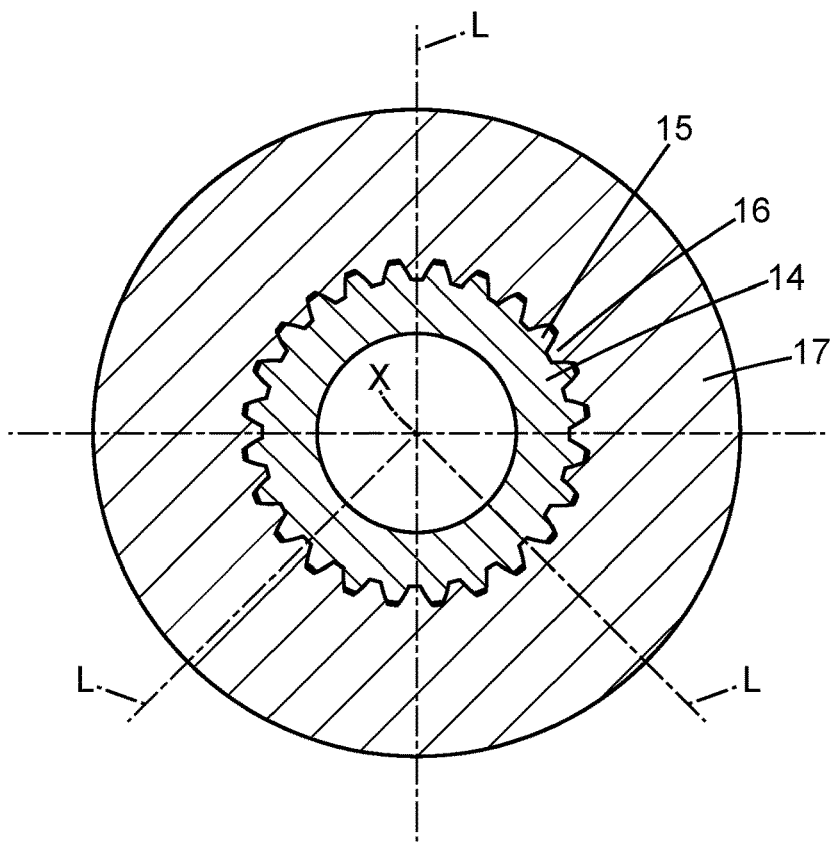
FIG. 4 is a sectional view of a coupling between the splined shaft of the planet carrier and an output shaft, connected to the fan.
Figure 5:
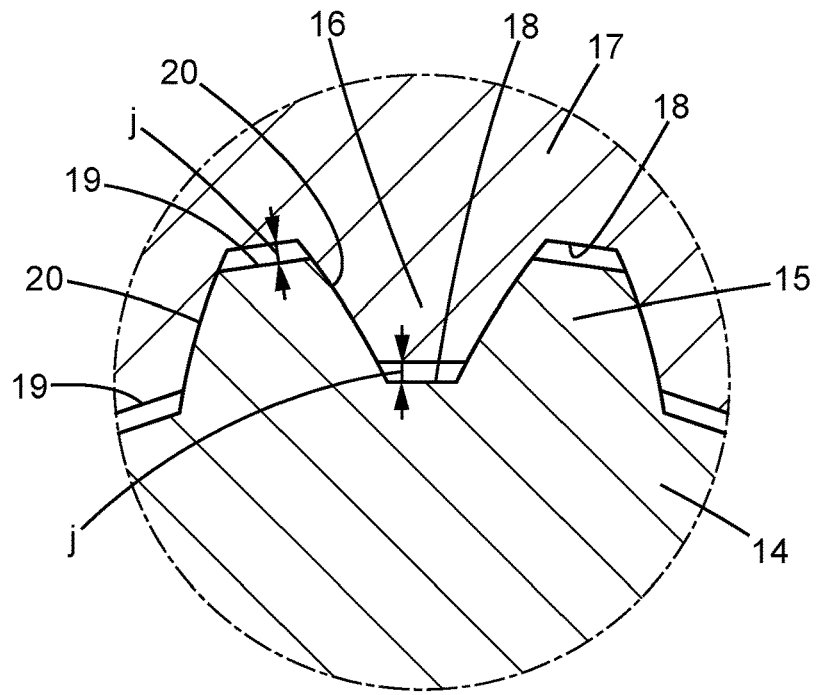
FIG. 5 is a detail view of FIG. 4.

The planet carrier 10 is herein intended to form an output (epicyclic configuration) and includes a splined male shaft 14, i.e. for which the splines 15 are external. Said shaft 14 is herein a hollow shaft. Of course, the disclosure also applies to the case of a female shaft, where the splines are internal. The splines 15 of the shaft 14 of the planet carrier 10 are intended to cooperate with complementary splines 16 of an output shaft 17 connected to the fan S of the turbine engine 1, as illustrated in FIGS. 4 and 5.

Each spline 15, 16 includes a bottom land 18, a top land 19 and two flanks 20. The flanks 20 may be an involute of a circle, as illustrated in FIGS. 4 to 7, or straight. A clearance j is formed between the bottom lands 18 and the top lands 19 of the splines 15, 16.

As indicated before, during the operation of the turbine engine 1, a torque transits in the planet carrier 10 radially along directions or lines L each connecting one of the support axes 10b of planet gears 8 and the axis X of the planet carrier 10.

It has been noticed that the absence of a homogeneous distribution of the loads over the circumference, or the periphery, of the planet carrier 10 generates a slight deformation of the splined shaft 14, so that some splines 15, so-called active, come into contact with the corresponding complementary splines 16 while other splines 15, so-called passive, have less pronounced contacts, and possibly no contact, with the complementary splines 16. In practice, the active splines 15 are located over and proximate to each of the aforementioned lines L, the passive splines 15 being away from said lines L. In such a case, the loads transit through the splines 15 that are active, to the detriment of the passive splines 15, so that the distribution of the loads is not homogeneous over the entire circumference.

In order to overcome this drawback and obtain a more homogeneous distribution of mechanical stresses in the splined shaft 14, the disclosure suggests modifying the pitch of at least some of the splines 15 of the shaft 14.

Figure 6:
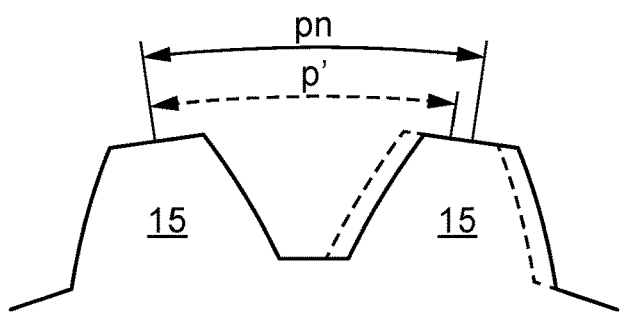
FIG. 6 is a schematic view illustrating the advance of a spline.

FIG. 6 illustrates the case where the pitch p is reduced with respect to the nominal pitch pn. In such a case, the spline 15 whose pitch is modified is so-called in advance. The difference $\Delta p$ is defined by $\Delta p = pn - p$. In such a case, $\Delta p$ is positive.

Figure 7:
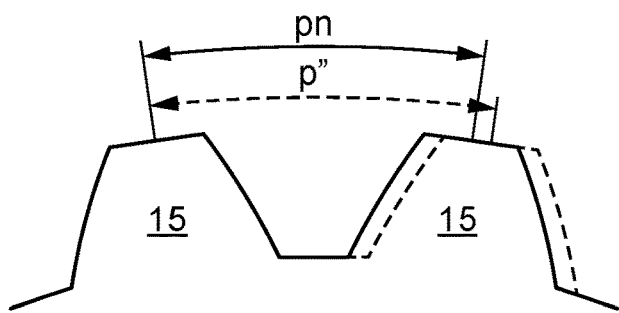
FIG. 7 is a schematic view illustrating the delay of a spline.

FIG. 7 illustrates the case were the pitch p is increased with respect to the nominal pitch pn. In such a case, the spline 15 whose pitch is modified is so-called delayed. In such a case, $\Delta p$ is negative.

By R, is defined the ratio of the absolute value of $\Delta p$ to the nominal pitch pn, namely $R = /pn$.

This ratio R may progressively vary from one spline 15 to another, at least some of the splines 15 having a non-zero ratio R, for example comprised between 0.5 and 5%.

Figure 8:
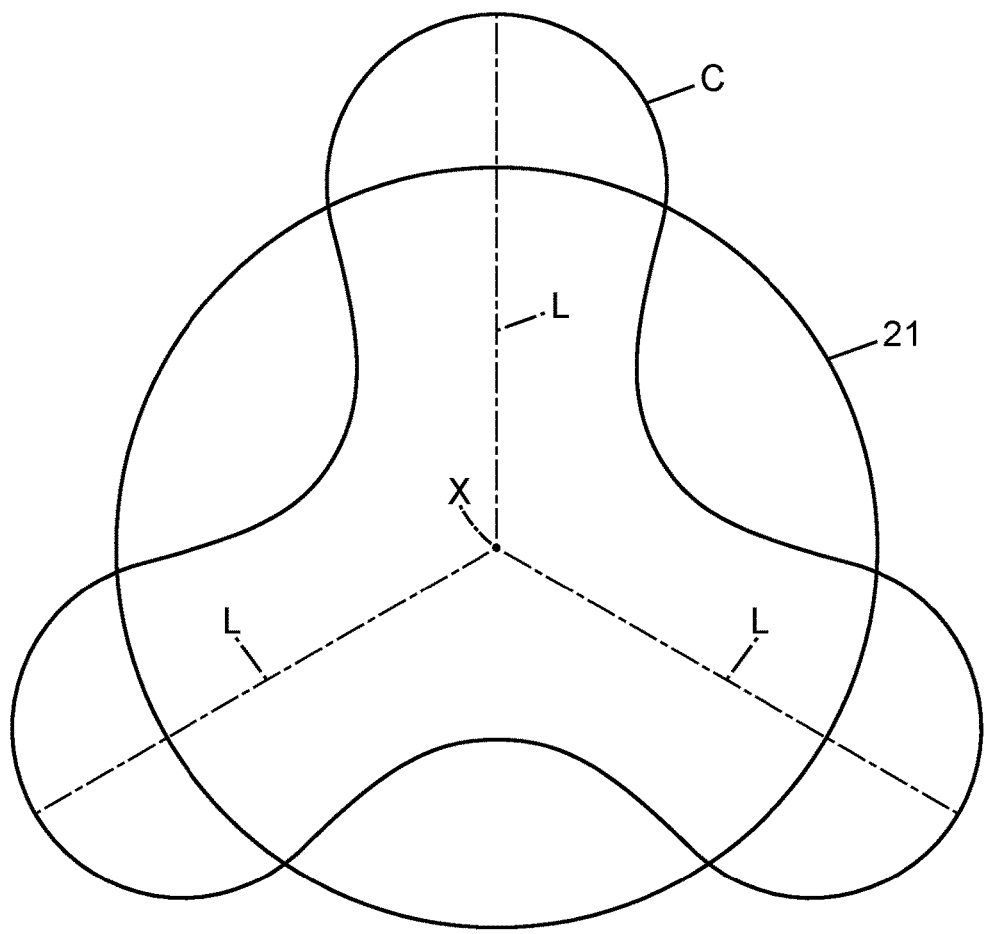
FIG. 8 is a schematic view illustrating the variation of the difference between the nominal pitch and the modified pitch of the splines, along the circumference, or the periphery, in the case of a sinusoidal-type variation.
Figure 9:
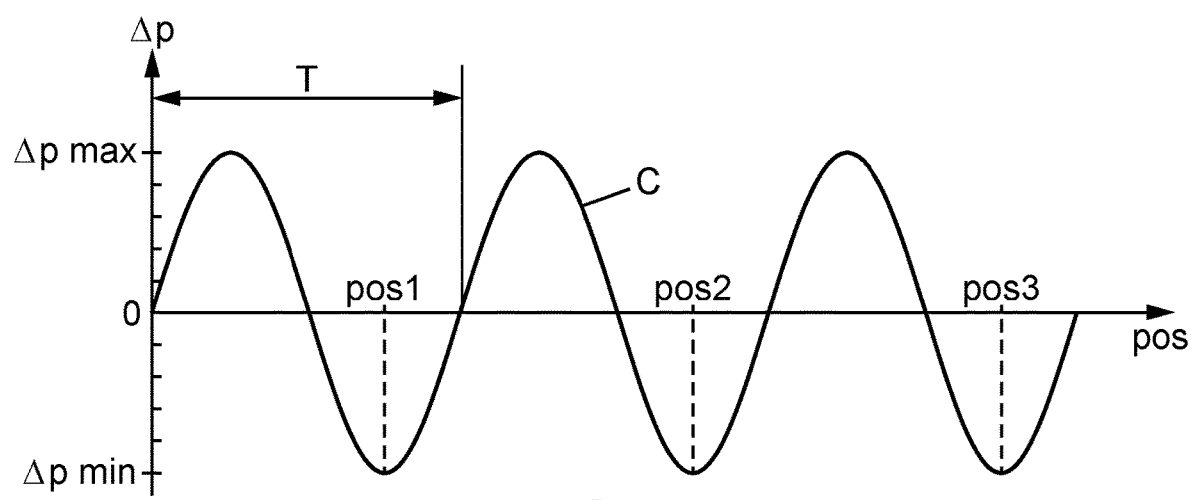
FIG. 9 is a schematic view illustrating the variation of the difference between the pitch of the splines and the nominal pitch, along the circumference, or the periphery, in the case of a stepped variation.

FIGS. 8 and 9 illustrate the variation of $\Delta p$ as a function of the position of the spline 15. In particular, in FIG. 8, the circle 21 represents the pitch diameter of the splines 15 and the curve C illustrates the evolution of $\Delta p$ as a function of the position of the corresponding spline 15 over the circumference. FIG. 9 is another type of representation illustrating in two dimensions the variation of $\Delta p$ (in ordinates) as a function of the position of the spline 15 (in abscissas).

In particular, the pitch p of the splines 15 are modified so that the variation of $\Delta p$ as a function of the position of the corresponding spline 15 over the circumference generally follows a sinusoidal law oscillating between a maximum value Δpmax and a minimum value Δpmin and including three periods T over the circumference. The splines 15 whose pitches have a value of Δp equal or close to Δpmin, are located at the aforementioned lines L. Conversely, the splines 15 whose pitches have a value of Δp equal or close to Δpmax, are located circumferentially away from the aforementioned lines L.

Figure 10:
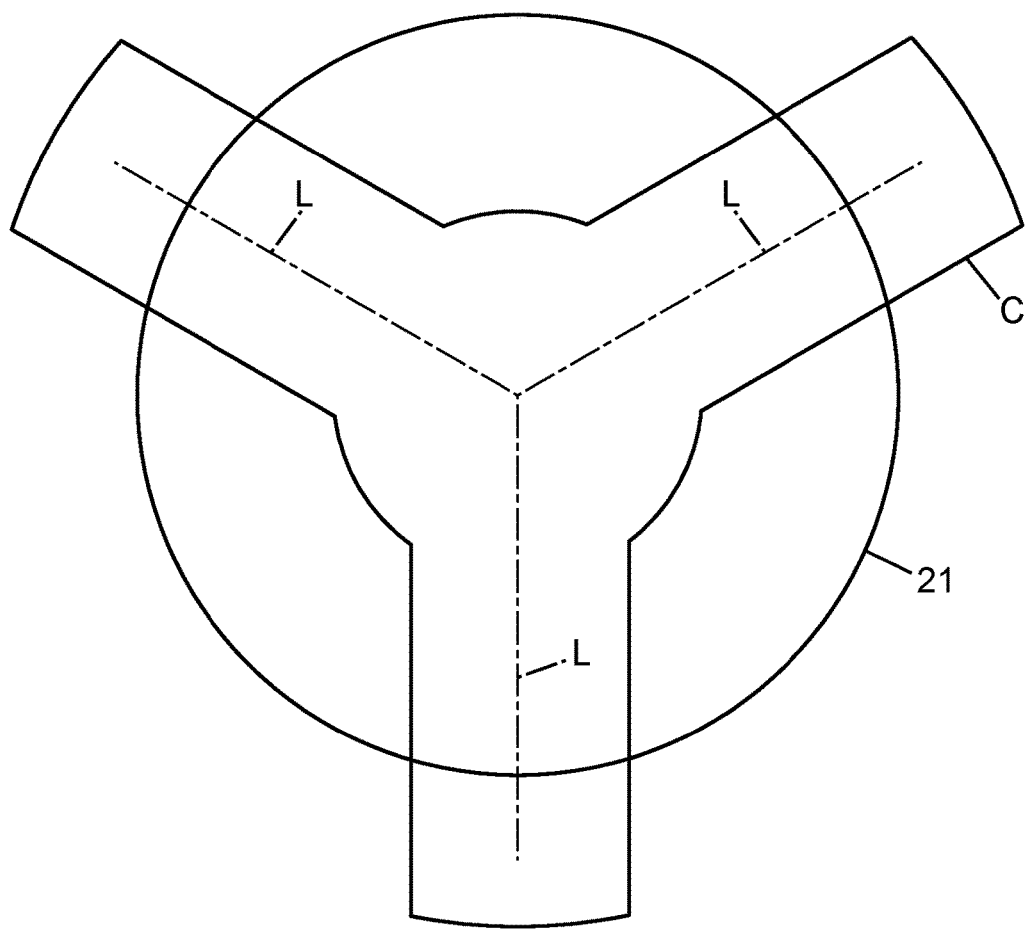
FIG. 10 is a view corresponding to FIG. 8, illustrating a stepped variation of the difference between the modified pitch and the nominal pitch of the splines.
Figure 11:
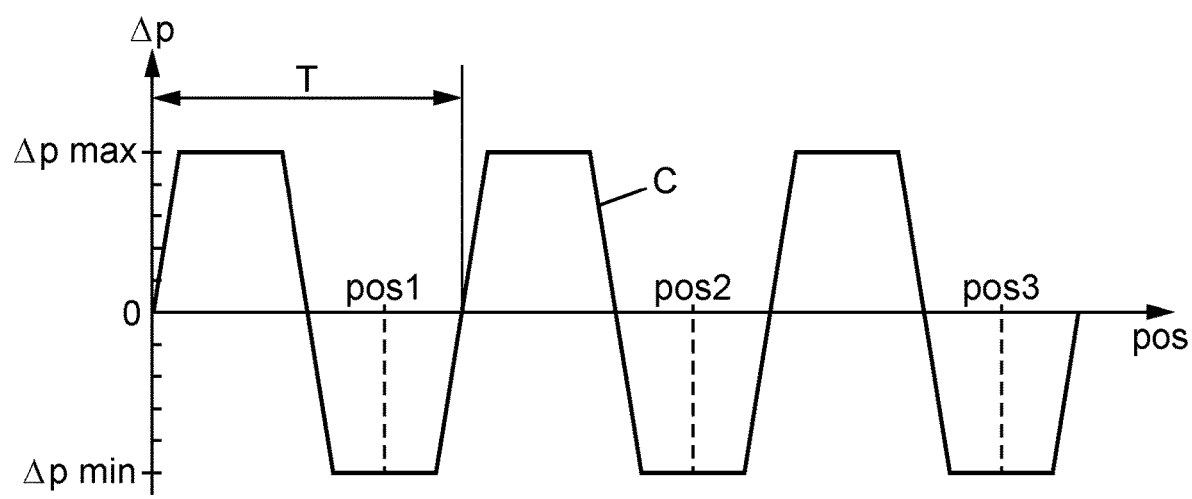
FIG. 11 is a view corresponding to FIG. 9, illustrating said stepped variation of the difference between the modified pitch and the nominal pitch of the splines.

FIGS. 10 and 11 respectively correspond to FIGS. 8 and 9 and illustrate another type of variation of the difference Δp, namely a stepped variation, herein two steps: a minimum step Δpmin and a maximum step Δpmax. Thus, several splines 15 may have the same value Δpmin, in the vicinity of the aforementioned lines L, and several splines 15 may have the same value Δpmax, at a distance from said lines L. The variation between the two bearings may follow a continuous progressive law, for example linear. Of course, said stepped variation may have more than two steps, for example four steps, namely a step with a value Δpmax, a step with a value Δpmin, a negative intermediate step, with a value higher than Δpmin and a positive intermediate step, with a value lower than Δpmax.

Regardless of the law that is used for the variation of Δp, modifying the pitch p of at least some splines 15 allows making some splines 15 less active and making other splines 15 more active, so as to better distribute the loads over all splines 15 distributed over the circumference of the splined hollow shaft 14.

For at least some splines 15, the modification of the pitch should have a non-zero maximum ratio $R=|\Delta p|/pn$, for example comprised between 0.5 and 5%.

In particular, the maximum value of this ratio R is obtained for Δpmax and for Δpmin. Δpmax may be equal to −Δpmin. Δpmax may be comprised between −−100 microns and +100 microns, for example, for a nominal pitch of 7.98 mm, for example. For example, Δpmax may be comprised between −500 microns and +500 microns, in particular between −200 microns and +200 microns.

The modification of the pitch of the splines 15 may be obtained directly when making the splines 15 or obtained after machining of at least one portion of the splines 15, for example by grinding.

In the context of the previous description, the modification concerns the splines 15 of the shaft 14 of the planet carrier 10. Of course, it is also possible to modify the complementary splines 16 of the output shaft 17, without departing from the scope of the disclosure. In general, it should be noted that it is easier to machine male splines 15.

The invention claimed is:

1. A splined shaft for a turbine engine having a periphery and comprising splines evenly distributed over the periphery, the splines being spaced apart from each other, at least one portion of the splines being spaced apart by a modified pitch p with respect to a nominal pitch pn of the splines, a ratio of an absolute value of a difference between the modified pitch and the nominal pitch (Δp), to the nominal pitch, i.e. $|pn-p|/pn$ being different from zero, wherein the difference (Δp) between the nominal pitch pn between the splines with respect to the modified pitch p, along the periphery, progressively increases or decreases from one spline to another, as the periphery of the splined shaft is covered, said difference increasing up to a maximum (Δpmax) before decreasing down to a minimum (Δpmin).

2. The splined shaft according to claim 1, wherein, for at least one portion of the splines, wherein the difference (Δp) between the modified pitch and the nominal pitch is positive, said splines being so-called in advance, and for at least one other portion of the splines, the difference (Δp) between the modified pitch and the nominal pitch is negative, said splines being so-called delayed.

3. The splined shaft according claim 1, further comprising, along the periphery, at least one alternation of splines in advance and of delayed splines.

4. The splined shaft according to claim 3, further comprising, along the periphery, several successive alternations of splines in advance and of delayed splines.

5. The splined shaft according to claim 1, wherein an evolution of the pitch difference between the splines with respect to the nominal pitch, along the periphery, follows a generally sinusoidal law.

6. The splined shaft according to claim 1, wherein the evolution of the difference of the pitch between the splines with respect to the nominal pitch, along the periphery, is a stepped evolution.

7. A planet carrier for a planetary gear train, including at least one support axis configured for mounting a planet gear and at least one splined shaft, the splined shaft having a periphery and comprising splines evenly distributed over the periphery, the splines being spaced apart from each other, at least one portion of the splines being spaced apart by a modified pitch p with respect to a nominal pitch pn of the splines, a ratio of an absolute value of a difference between the modified pitch and the nominal pitch (Δp), to the nominal pitch, i.e. $|pn-p|/pn$ being different from zero.

8. The planet carrier according to claim 7, wherein at least one delayed spline is located on or proximate to a (L) connecting the splined shaft or an axis (X) of the planet carrier, on the one hand, and the support axis of the planet, on the other hand, and/or at least one advanced spline is away from said line (L).

9. A planetary gear train for a turbine engine, including at least one planet carrier according to claim 7.

10. A splined shaft for a turbine engine, the splined shaft having a periphery and comprising splines evenly distributed over the periphery, the splines being spaced apart from each other, at least one portion of the splines being spaced apart by a modified pitch p with respect to a nominal pitch pn of the splines, a ratio of an absolute value of a difference between the modified pitch and the nominal pitch (Δp), to the nominal pitch, i.e. $|pn-p|/pn$ being different from zero, wherein the ratio of the absolute value of the difference between the modified pitch and the nominal pitch, to the nominal pitch, i.e. $|pn-p|/pn$ is between 0.5 and 5%.

* * * * *